United States Patent [19]
McNeese et al.

[11] 3,853,979
[45] Dec. 10, 1974

[54] METHOD FOR REMOVING RARE EARTHS FROM SPENT MOLTEN METALLIC FLUORIDE SALT MIXTURES

[75] Inventors: Leonard E. McNeese, Oak Ridge; Leslie M. Ferris, Knoxville; Fred J. Smith, Oak Ridge, all of Tenn.

[73] Assignee: The United States of America as represented by the United States Atomic Energy Commission, Washington, D.C.

[22] Filed: Aug. 14, 1972

[21] Appl. No.: 280,315

Related U.S. Application Data

[63] Continuation of Ser. No. 30,422, April 21, 1970, abandoned.

[52] U.S. Cl............ 423/5, 75/84.1 A, 252/301.1 R, 423/3, 423/8, 423/21, 423/252
[51] Int. Cl............................................. C01g 56/00
[58] Field of Search................ 423/3, 5, 8, 21, 252; 75/84.1, 84.1 A; 252/301.1 R

[56] References Cited
UNITED STATES PATENTS

| | | | |
|---|---|---|---|
| 2,840,464 | 6/1958 | Wiswall............................ | 75/84.1 A |
| 3,577,225 | 5/1971 | Shaffer et al. .......................... | 423/5 |

OTHER PUBLICATIONS

Baries et al., Nucleonics, Vol. 12, No. 7, pp. 16–19, (1954).
AEC document ORNL 4076 pp. 34–38, (1967).
AEC document ORNL 4254, pp. 152–155, 159–165, (1968).
Ferris et al., Transactions of the American Nuclear Society, Vol. 12, No. 1, pp. 26–27, (1969).

*Primary Examiner*—Stephen J. Lechert, Jr.
*Assistant Examiner*—R. E. Schafer
*Attorney, Agent, or Firm*—John A. Horan; Dean E. Carlson

[57] ABSTRACT

An improved method for reprocessing spent molten metallic fluoride salt mixtures of rare earths is provided wherein the rear earths are reductively extracted from the spent molten salt which is essentially free of uranium and protactinium values into a molten bismuth solution containing lithium and/or thorium metal reductants, then back extracted from the bismuth solution into an acceptor salt solution selected from the group consisting of lithium chloride, lithium bromide and mixtures thereof, and finally recovered from the acceptor salt solution.

3 Claims, 3 Drawing Figures

METHOD FOR REMOVING RARE EARTHS FROM SPENT MOLTEN METALLIC FLUORIDE SALT MIXTURES

This is a continuation, of application Ser. No. 30,422, filed Apr. 21, 1970, now abandoned.

BACKGROUND OF THE INVENTION

The invention herein was made in the course of, or under, a contract with the United States Atomic Energy Commission. It relates generally to methods for reprocessing nuclear reactor fuels and more particularly to an improved metal transfer method for removing rare earths from spent molten metallic fluoride salt mixtures suitable fuels for molten salt breeder reactors.

Extensive investigation of molten metallic fluoride salt mixtures has demonstrated their suitability as nuclear reactor core and blanket fluids. Of recent interest is the use of such salt mixtures in a single fluid, double region molten salt breeder reactor which is described in Ser. No. 733,843, filed on June 3, 1968, in the names of Edward S. Bettis et al. for "Single Fluid Molten Salt Nuclear Breeder Reactor." In order for a breeder reactor to operate efficiently, means must be provided for the continuous and periodic removal of the bred-in protactinium and certain fission products, viz., rare earth elements of atomic numbers 57–62 of the lanthanide series which generally account for more than 50 percent of the parasitic neutron absorption of the fuel mixture. The other fission products may be maintained at acceptable neutron poison levels by several well known techniques. Accordingly, the term "rare earths" as used hereinafter is intended to refer only to those elements of atomic numbers 57–62 plus other elements which behave similarly; these consist of Y, Sr, and Ba.

Methods for reprocessing spent molten metallic fluoride salt mixtures of protactinium and rare earths have heretofore been devised. One method was disclosed in Ser. No. 824,944, filed on May 15, 1969, in the names of James H. Shaffer et al. for "Method for Separating Uranium, Protactinium, and Rare Earth Fission Products From Spent Molten Fluoride Salt Reactor Fuels." This method removed the protactinium and rare earths from the spent salt mixture by reductive extraction, i.e., contacting the salt mixture with bismuth solution which contains a metal reductant, such as lithium and/or thorium, to thereby reduce sequentially the protactinium and rare earth values to the metal state and cause the respective metals to transfer into the bismuth phase. The uranium, being less electropositive than either the protactinium or the rare earths, is reductively extracted initially. In order to effect the sequential removal and separate recovery of first uranium, then protactinium and finally the rare earths, the respective extracted values must be separately back extracted from the bismuth phase into a fluoride salt. In this prior art process the salt was a molten fluoride salt mixture which preferably was of the same composition as the fuel mixture. While an operable separation process was demonstrated, the separation factor for the rare earths from thorium using a fluoride salt was in the range of 1–3.5.

The currently accepted rare earth removal method, developed by L. E. McNeese and M. E. Whatley and described in ORNL-4396, "Molten Salt Reactor Program – Semiannual Progress Report for Period Ending Feb. 28, 1969" exploits the low rare earth-thorium separation factors (1–3.5) observed between bismuth and the fluoride fuel salt. In this method, the fluoride fuel salt containing rare earths, but free of uranium and protactinium is countercurrently contacted with bismuth containing thorium and lithium to reductively extract the rare earths from the salt phase into the metal phase. A relatively large electrolytic cell is used for individually refluxing the thorium and the rare earths at the ends of the column. In this manner, the concentration of rare earths in the salt in one part of the system is increased significantly over the reactor concentration and to a level such that these materials can be removed from the system by discard of salt at a low rate. Because the rare earth-thorium separation factors are near unity, this method required a large number of equilibrium stages (25 to 30) and high metal-to-salt flow rate ratios (as high as 85).

It is therefore highly desirable and an object of this invention to provide an improved method for reprocessing spent molten fluoride salt mixtures of rare earths.

SUMMARY OF THE INVENTION

This object is achieved by the discovery that a molten salt composition, hereinafter referred to as the "acceptor salt," significantly different from the molten fuel salt provides a high selectivity for transfer of the rare earths but not thorium from a rate earth-laden bismuth metal extractant into the molten salt phase. More specifically, in a rare earth removal operation wherein the rare earths are originally extracted from a spent molten salt reactor fuel into molten bismuth and then back extracted from the bismuth solution, it has been found that an acceptor salt selected from the group consisting of lithium chloride, lithium bromide, and mixtures thereof provides a marked improvement in the separation factor of the rare earths from the thorium. Thus, this discovery affords a basis for an improved bismuth recycle with resulting short rare earth removal times, negligible loss of thorium, and increased breeding ratios in molten salt breeder reactors. Separation factors of the rare earths from thorium using the present acceptor salt differ by more than 4 orders of magnitude from separation factors obtained with the previously employed fluoride salt. In a continuous liquid-liquid extraction operation (50-day removal time) using a chloride or bromide acceptor salt, less than 5 equilibrium stages are required in the contactors with a molten fluoride salt flow rate of about 3 gallons/minute (30-day processing time). The extremely large separation factors obtained in the present process can be used to obtain rare earth removal times much shorter than the 50day removal time given by the previous process; this would result in significant increases in breeding ratio. Where all of the rare earths are, for example, removed on a 3-day cycle the breeding ratio for a single region molten salt reactor would be increased by 0.014.

DESCRIPTION OF THE PREFERRED EMBODIMENT

Figure 1:
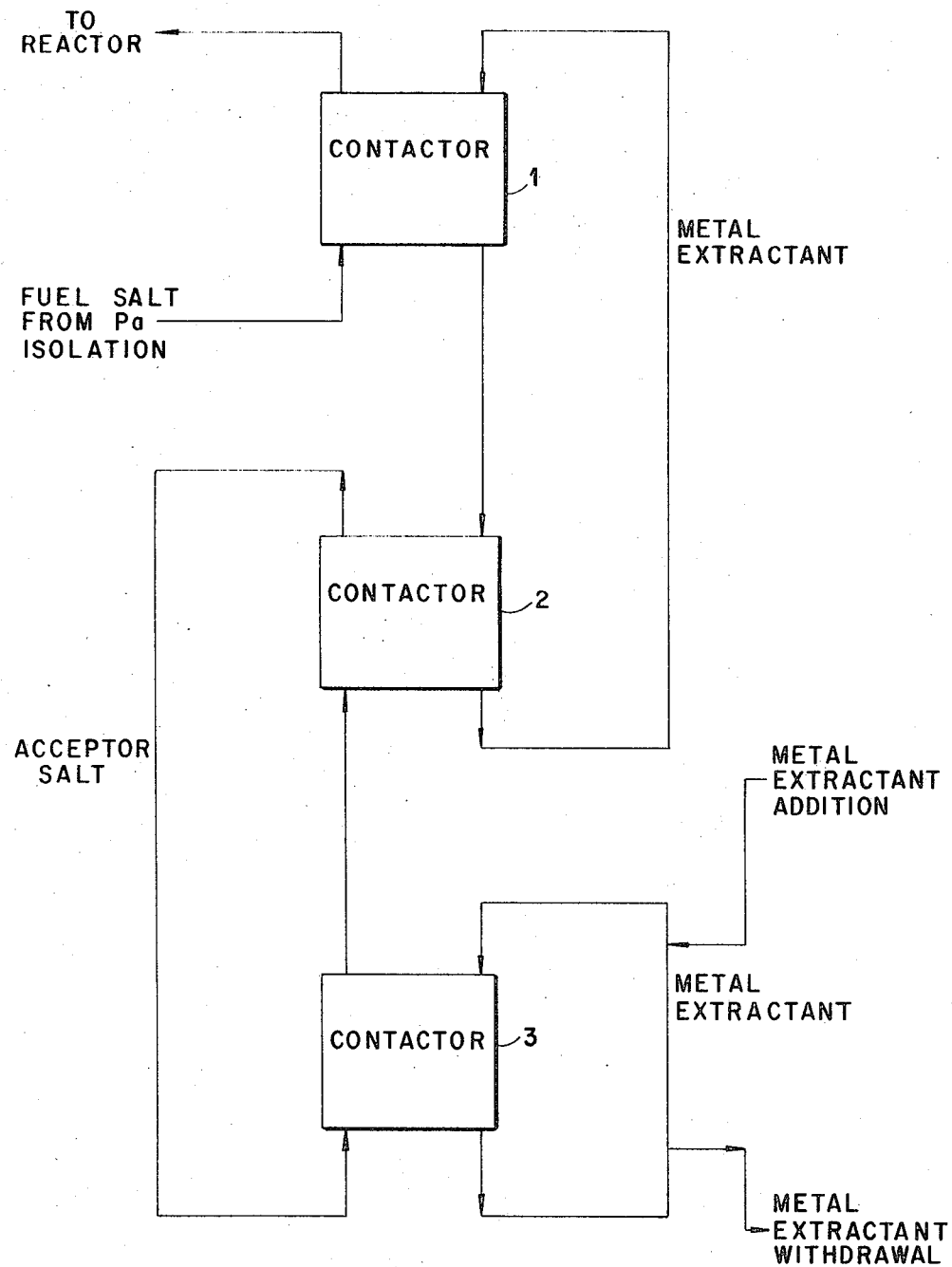
FIG. 1 is a flow diagram of a preferred method for reprocessing spent molten metallic fluoride salt mixtures which are essentially free of uranium and protactinium of the rare earths.

Referring to FIG. 1, a spent molten metallic fluoride salt mixture, such as LiF — BeF$_2$ — ThF$_4$ — UF$_4$ (71.7 – 16 – 12 – 0.3 mole percent) and which contains about 115 ppm rare earths, is countercurrently contacted in contactor 1 with a molten bismuth solution containing a metal reductant. The salt mixture feed solution for contactor 1 should be essentially free of uranium and protactinium values, containing only the rare earths. This is required since any uranium or protactinium would accumulate in the bismuth phase and use up the metal reductant. The method in which the uranium and protactinium values are separated from the spent molten salt prior to this first step forms no part of the invention and may be achieved in any suitable manner. In Ser. No. 30,423, filed of even date with the above-mentioned application Ser. No. 30,422 in the names of L. E. McNeese and D. E. Ferguson for "Method For Reprocessing Spent Molten Metallic Fluoride Salt Mixtures," a continuous method for reprocessing spent molten metallic fluoride salt mixtures was described. In that method a major fraction of the uranium is initially volatilized by fluorination and thereafter in a protactinium isolation unit the remaining uranium, along with the protactinium values, is reductively extracted into molten bismuth by metal reductants of lithium, thorium $^{233}$Pa and $^{233}$U. The extracted uranium values pass out of the unit in the bismuth phase while the protactinium is refluxed within the unit in the bismuth phase. The resulting spent salt mixture contains only the rare earths which could serve as the feed solution for the present reprocessing method. Uranium and protactinium values may also be removed from spent molten salt mixtures by reductive extraction into molten bismuth which contains lithium and thorium in another priorly known process.

The invention will hereinafter be described with reference to reprocessing spent molten metallic salt mixtures employed as fuel in a 1000 Mw(e) molten salt breeder reactor (1700 ft$^3$ core volume) under the following conditions: spent salt flow rate - 2.9 gpm; bismuth flow rate - 8.4 gpm; acceptor salt flow rate - 11.2 gpm; metal addition (and withdrawal) - 22.7 liters/day; removal time - 50 days except 220 days for europium. The total concentration of the rare earths in the spent molten salt stream is 115 ppm. The metal reductant contained in the bismuth stream in contactor 1 is preferably lithium and thorium at concentrations of 0.002 and 0.0025 mole fraction, respectively. The spent salt mixture is contacted countercurrently in contactor 1 with the bismuth solution and part (60 percent) of the rare earths is reduced from the fluoride to the metal state and extracted from the salt phase into the down-flowing bismuth phase. The molten fluoride salt mixture exiting contactor 1, being substantially reduced in rare earth content (45 × 10$^{-6}$ mole fraction) is recirculated to the reactor.

In contactor 2 the rare earth-laden bismuth solution is contacted countercurrently with an acceptor molten salt solution selected from the group consisting of lithium chloride, lithium bromide, and mixtures thereof where part (60 percent) of the rare earths is oxidized and transferred into the acceptor salt phase. This oxidation reaction proceeds as follows:

$M_{(Bi)} + nLiCl \rightarrow nLi_{(Bi)} + MCl_n$ where M designates any rare earth of valence n. The bismuth stream exiting contactor 2 is recycled as a closed loop to the entrance end of contactor 1 and the acceptor salt solution is recycled as a closed loop to the salt entrance end of contactor 3.

The acceptor salt solution, which has a substantial rare earth content, is then processed in contactor 3 to remove the rare earths. Removal of the rare earths from the acceptor salt solution may be achieved by any one of a number of suitable means, such as reductive extraction with a molten bismuth stream containing a relatively high lithium concentration, extraction using zeolitic materials which are stable in the particular acceptor salt and which are specific for cations other than that of the acceptor salt cation, distillation, or reductive extraction using lithium in metals other than bismuth (e.g., zinc). The acceptor salt solution, preferably, is contacted in contactor 3 countercurrently with a second molten bismuth stream (8.4 gpm), which is recirculated only through contactor 3. This bismuth phase differs from the first bismuth stream employed in contactors 1 and 2 in the respect that it carries a comparatively high concentration of lithium as the metal reductant; a suitable concentration range is from 0.05 to 0.5 mole fraction lithium. In this contactor essentially all of the rare earths contained in the molten salt solution are reduced and transferred into the bismuth phase. This reductive extraction operation is exactly the reverse of the oxidation extraction taking place in contactor 2. From the salt exit of contactor 3 the molten salt solution, which is essentially free of the rare earths, is recirculated to the salt entrance of contactor 2 to complete the closed loop.

A small part (22.7 liters/day) of the recirculated second bismuth solution containing a high concentration of rare earths (0.005 mole fraction) is withdrawn from the effluent bismuth solution from contactor 3 and a small make-up solution (22.7 liters/day) of bismuth having a lithium content of 0.064 mole fraction is added back to the recirculating bismuth solution at the metal entrance end of contactor 3. The minimum rate at which the molten acceptor salt solution is processed for removal of the rare earths is given by the ratio of the production rate of a given rare earth to its equilibrium concentration in the salt phase. Where the acceptor salt is lithium chloride the minimum processing rate is set by neodymium and is 1.29 × 10$^6$ g-mole lithium chloride/day for the 1000 Mw(e) reference reactor. The rare earth-laden bismuth withdrawal solution from contactor 3 may conveniently be reprocessed by oxidation in the presence of a suitable waste salt in order to recover the bismuth or by hydrochlorination and extraction into bismuth with less lithium. Where the latter operation is used the bismuth solution would then be oxidized as before. Another alternative is discard of the withdrawal stream.

Advantageously, the extremely high separation factors of the rare earths from thorium obtained with the

TABLE

EQUILIBRIUM CONCENTRATION OF SELECTED RARE EARTHS IN MOLTEN BISMUTH AND LITHIUM CHLORIDE

| Fuel Salt | Bismuth | Lithium Chloride |
|---|---|---|
| $X_{LiF} \times 0.72$ | $X_{Li} = 0.00201$ | — |
| $X_{BeF_2} = 0.16$ | — | — |
| $X_{ThF_4} = 0.12$ | $X_{Th} = 0.0025$ | — |
| $X_{LaF_3} = 0.8 \times 10^{-6}$ | $X_{La} = 0.524 \times 10^{-6}$ | $X_{LaCl_3} = 0.331 \times 10^{-7}$ |
| $X_{NdF_3} = 26.2 \times 10^{-6}$ | $X_{Nd} = 1.47 \times 10^{-6}$ | $X_{NdCl_3} = 0.607 \times 10^{-6}$ |
| $X_{EuF_2} = 0.287 \times 10^{-6}$ | $X_{Eu} = 0.664 \times 10^{-8}$ | $X_{EuCl_2} = 1.02 \times 10^{-6}$ |
|  |  | $X_{EuCl_2} = 8.22 \times 10^{-6}$ | present acceptor molten salt afford wide latitude in choosing operating conditions (i.e., removal times, number of equilibrium stages and flow rates) to yield desired removal times for the method rare earths and significant increases in breeding ratios. While the previously employed rare earth reprocessing method using a fluoride salt required about 25 equilibrium stages, the required number of stages in contactors 1 and 2 using the present acceptor salt lies between 2 and 6 stages. Where three equilibrium stages are employed in each of the contactors, the required removal times would be 34 days for lanthanum, 38 days for neodymium and 220 days for europium. Increasing the size of the contactors to provide throughputs of bismuth and acceptor salt of 84 gpm and 112 gpm, respectively, the rare earth removal times at the same spent fuel salt flow rate (2.9 gpm) can be shortened to 3 to 15 days for lithium concentrations of 0.05 to 0.5 mole fraction in contactor 3. Rare earth removal times of 3, 5, and 7 days would provide increases in the breeding ratio of 0.014, 0.0126, and 0.0115, respectively. It should thus be apparent to those skilled in the art that the acceptor salts of the present invention serve as more than simply a receptor for materials as did the previously used fluoride salts but provide a high selectivity for transfer of the rare earths and not the thorium, not heretofore thought achievable.

The temperature at which the rare earth removal system is operated may vary over a wide range. In general, all solutions should be maintained at a temperature above the liquidus temperature of the particular molten salt mixtures employed. To insure a safe margin for process control, it is preferred that the temperature of each solution be maintained at least 30°C above the liquidus temperature of the molten salt mixture and temperatures above 800°C are not recommended. The melting point of lithium chloride is about 614°C and for lithium bromide is about 557°C. The liquidus of a 75-25 mole percent lithium chloride-lithium bromide solution is 520°C. The liquidus for the salt mixture LiF — BeF$_2$ — UF$_4$ (65.7 – 34 – 0.3 mole percent) is 460°C and for the salt mixture LiF — BeF$_2$ — ThF$_4$ — UF$_4$ (71.7 – 16 – 12 – 0.3 mole percent) is 500°C. A preferred operating temperature for reprocessing a spent salt mixture of LiF — BeF$_2$ — ThF$_4$ — UF$_4$ (71.7 – 16 – 12 – 0.3 mole percent) is about 650°C.

Figure 2:
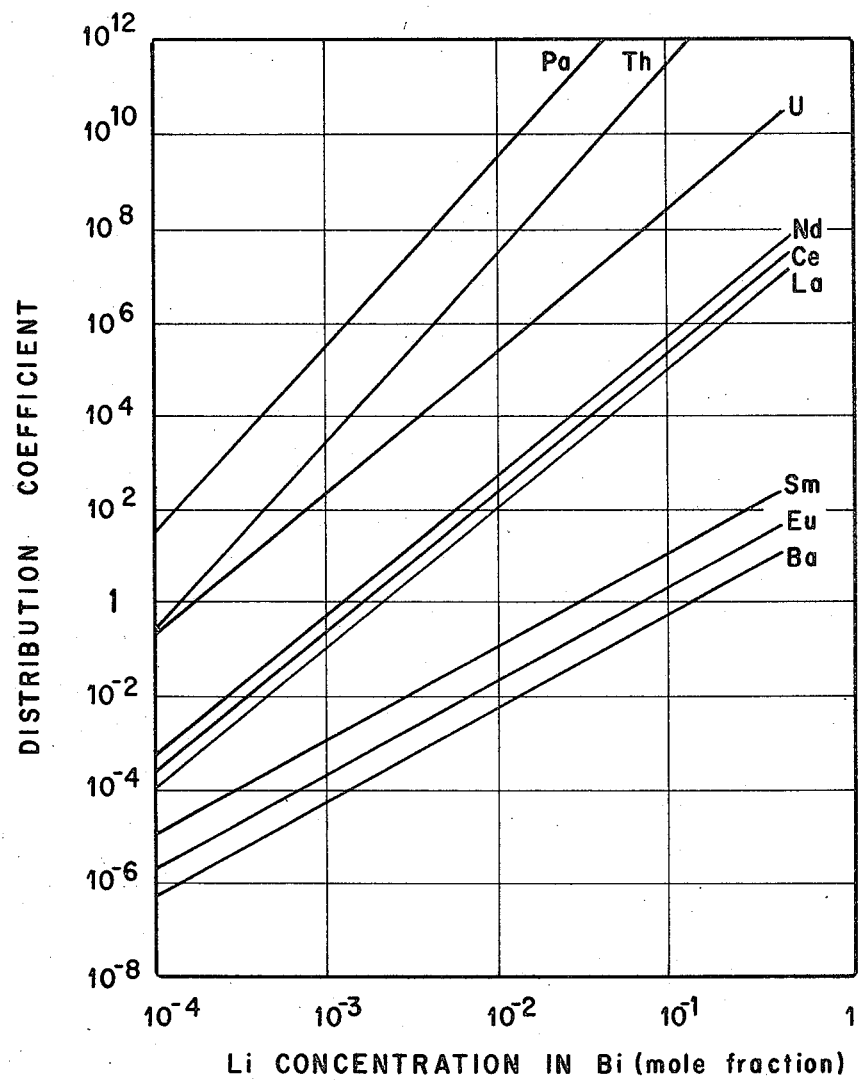
FIG. 2 is a plot showing distribution coefficients of the rare earths and protactinium, uranium and thorium between molten bismuth and a lithium chloride acceptor salt at 640°C.
Figure 3:
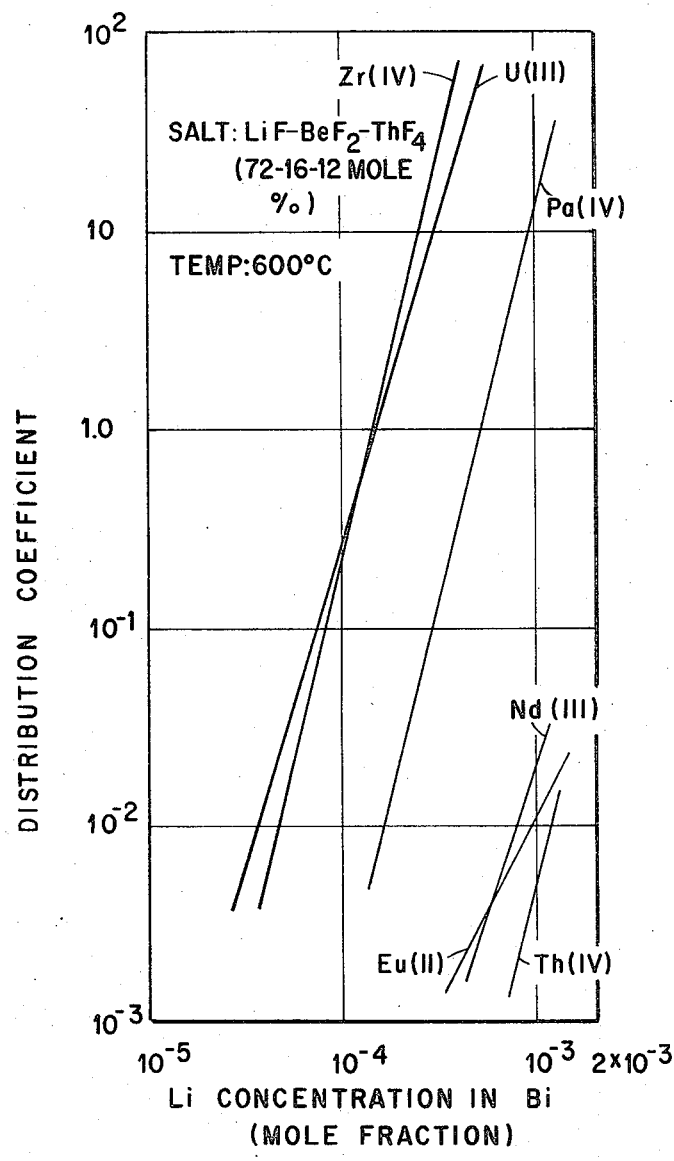
FIG. 3 is a plot showing distribution coefficients of selected rare earths and protactinium, uranium, zirconium, and thorium between molten bismuth and a fluoride fuel salt LiF — BeF$_2$ — ThF$_4$ (72 – 16 – 12 mole percent) at 600°C.

The equilibrium concentration of selected rare earths in bismuth and lithium chloride at 640°C (630°C for europium) for a 50-day removal time for the rare earths are given in the table below. These data were calculated using the experimentally determined distribution coefficients shown in FIGS. 2 and 3. The lithium reductant concentration in the bismuth is selected such that the thorium concentration was 95 percent of the thorium solubility in bismuth at 640°C.

Viewing the data it will be apparent that the rare earths are present in the lithium chloride solution at low concentrations and are associated with only a small amount of thorium. It will be observed that whereas the distribution coefficients for the rare earths are greater than that for thorium in the prior art bismuth-fluoride salt system (see FIG. 3) the distribution coefficient for thorium is greater than that for the rare earths in the present bismuth-acceptor salt system (see FIG. 2). Hence, in order to conform to the conventional practice of defining the separation factor such that its value is greater than 1, the rare earths-thorium separation factor for comparison purposes for the prior art system is defined as $$S_{Re-Th} = D_{RE}/D_{Th} = X_{RE(metal)}/X_{RE(salt)}/[X_{Th(metal)}/X_{Th(salt)}]$$

and the separation factor for the present system is defined as $$S_{Re-Th} = D_{Th}/D_{RE} = X_{Th(metal)}/X_{Th(salt)}/[X_{RE(metal)}/X_{RE(salt)}]$$

where $D_{Th}$ and $D_{RE}$ are the distribution coefficients of thorium and the rare earths and $X_{Th}$ and $X_{Re}$ are the mole fractions of thorium and the rare earths in either the metal or salt phase. The separation factors of selected rare earths from thorium for a LiCl solution and bismuth are $8.7 \times 10^4$ for La, $5.2 \times 10^4$ for Nd, and $9.3 \times 10^7$ for Eu. Comparison with the separation factor of the rare earth from thorium in a fluoride salt is given in FIG. 3 and is 1.8 for La, 3.0 for Nd, and 1.2 for Eu.

The distribution coefficients for various material including uranium, thorium and representative rare earths have been experimentally determined between lithium bromide and molten bismuth which contains a metal reductant. These values have been found to closely conform to the values obtained for the lithium chloride-bismuth system. It is therefore apparent that lithium bromide or mixtures of lithium bromide and lithium chloride would be equally acceptable as the acceptor salt.

It is therefore to be understood that all matters contained in the above description are illustrative only with many modifications and variations being made without departing from the scope of the invention, which is to be limited only by those indicated in the appended claims.

What is claimed is:

1. In a method for treating a liquid metal fluoride phase containing rare earths and thorium, in which said fluoride phase is contacted with a first liquid bismuth phase circulating in an enclosed cyclic path between a first contactor and a second contactor, said liquid bismuth phase containing a sufficient amount of a reductant selected from the group consisting of lithium and thorium to effect transfer of the rare earths and thorium into the liquid bismuth phase, the improvement which comprises:

1. flowing said rare earth and thorium laden liquid bismuth phase to said second contactor in contact therein with a liquefied acceptor salt phase selected from the group consisting essentially of LiCl, LiBr, and mixtures thereof at a temperature of at least 30° C above the liquidus of said acceptor salt phase to effect selective transfer of the rare earths into the acceptor salt phase, said acceptor salt traversing an enclosed cyclic path between said second contactor and a third contactor; and the
2. flowing said rare earth laden acceptor salt phase to said third contactor in contact therein with a second liquid bismuth phase containing from 0.05 to 0.5 mole fraction lithium to effect transfer of the rare earths from the acceptor salt phase to the second liquid bismuth phase.

2. The method according to claim 1 in which the acceptor salt phase consists essentially of 75 mole percent LiCl and 25 mole percent LiBr.

3. In a method of separating rare earths from thorium in a liquid bismuth phase containing from $10^{-4}$ to 1 mole fraction of lithium, the step of contacting the liquid bismuth phase with a liquid lithium halide phase consisting essentially of lithium chloride, lithium bromide, or mixtures thereof at a temperature of a least 30°C. above the liquidus of said halide phase to effect selective transfer of the rare earths into said liquid lithium halide phase.

* * * * *